US005758026A

United States Patent [19]

Lobley et al.

[11] Patent Number: 5,758,026
[45] Date of Patent: May 26, 1998

[54] SYSTEM AND METHOD FOR REDUCING BIAS IN DECISION SUPPORT SYSTEM MODELS

[75] Inventors: Donald J. Lobley, Baie d'Urfe; Edward S. Robins, Montréal, both of Canada

[73] Assignee: Arlington Software Corporation, Canada

[21] Appl. No.: 542,862

[22] Filed: Oct. 13, 1995

[51] Int. Cl.$^6$ .................................................. G06F 17/30
[52] U.S. Cl. ...................... 395/12; 395/50; 395/60; 395/76; 395/356; 707/5
[58] Field of Search .................... 395/605, 54, 12, 395/75, 76, 60, 50, 353–357

[56] References Cited

U.S. PATENT DOCUMENTS 4,613,946  9/1986  Forman .................................. 395/356
5,167,011  11/1992  Priest ..................................... 395/54

OTHER PUBLICATIONS

"Using Analytical Hierarchy Process (AHP) to Prioratize Tasks for Large-scale Sofware Systems", Yau et al., Journal of Systems Management, v44, n11, p26(6), Nov. 1993.

"Decision Support System for Thermal Power Plant Siting (SDSS)", Wang et al., Beijing, China, TENCON '93—1993 IEEE Region 10 Conference on Computer and Communication, Sep. 1993.

"Which & Why—An effective tool for decision making", Info Canada, v19, n7, p. 29(1), Jul. 1994.

Primary Examiner—Thomas G. Black
Assistant Examiner—Hosain T. Alam
Attorney, Agent, or Firm—Fitzpatrick, Cella, Harper & Scinto

[57] ABSTRACT

A method and system for balancing weights in models for decision support systems. When weights in such a model are assigned as local weights, evaluators may obtain non-intuitive results due to biases introduced by variations in the number of child factors of parent factors at a given level. Adjusting weights assigned within the model provides results which are often more intuitive to an evaluator. Two methods of calculating appropriate balancing coefficients to adjust weights are presented.

20 Claims, 7 Drawing Sheets

SYSTEM AND METHOD FOR REDUCING BIAS IN DECISION SUPPORT SYSTEM MODELS

BACKGROUND OF THE INVENTION

1. Field of the Invention

The present invention relates to decision support systems and, more particularly, to an improved method for creating and processing hierarchial models for such systems.

2. Description of the Prior Art

Decision support systems are well known. Typically, such systems are implemented on general or special purpose computer hardware and employ a hierarchial, multi criteria model including a system of weights for various factors of interest to the decision. When an alternative (possible decision) is considered, an appropriate score is assigned to the factors in the model, the score representing how well the alternative being considered meets the criteria defined for the respective factor. An evaluation score is created from the product of the assigned score and the respective factor's weight for each factor and the sum of all of the evaluation scores for an alternative is referred to as the weighted average of the alternative. Selection of alternatives is then normally based upon the ranking of the weighted averages of the alternatives.

The construction of decision models can be a complex and time consuming task. Systems such as Expert Choice (marketed by Expert Choice Inc., 5001 Baum Blvd, Suite 650, Pittsburg, Pa., USA, 15213) and Criterium Decision Plus (marketed by Sygenex, 15446 Bel-Red Road, Redmond, Wash., USA 98052) use the process described in "The Analytic Hierarchy Process", by Thomas L. Saaty, McGraw Hill 1980. In the Analytic Hierarchy Process (AHP), a decision model, as described above, is created which includes a hierarchical ordering of factors with broader, classifying, factors having lower level child factors. Often, several levels of classifying factors are employed above the 'leaf' factors at the bottom of the hierarchy, with only the leaf factors being scored by the evaluator. The weights of the various factors in each level may be determined through pair-wise comparisons, the process simplified by the hierarchical structure in that a group of factors in a level which are children of a single factor in a higher level are first compared, then the groups of child factors in the next lower level which are children of a higher level factor are compared through the process of pair-wise comparison, and a local distribution of weights created in each group.

The relative weights of the factors in the higher levels are propagated down to determine the final global weights of the children, until finally the leaf nodes are reached. To avoid the problems inherent in creating models with large numbers of child factors (and hence requiring many pair-wise comparison operations), either the number of children must be limited in each group (thereby limiting the model size) or the model refined in a way such that many child groups can be formed and the weights redistributed by some automated means. By illustration of this point, the number of required comparisons can be determined from $$\text{Comparisons} = \frac{N!}{(N-2)!2!}$$

where N is the number of factors in a level of the model. For example, the pairwise comparison of ten factors (N=10) required forty-five comparisons to be performed, the comparison of twenty factors (N=20) requires one hundred and ninety comparisons and the comparison of thirty factors (N=30) requires four hundred and thirty-five comparisons to be performed. It is clear that models requiring pairwise comparisons for many factors quickly become unwieldy and impractical for at least two reasons: the large amount of time required to perform the comparisons; and the likelihood that inconsistencies will occur in how various factors are ranked by the evaluator.

Alternatives to performing pairwise comparisons for all levels of a model have been developed. For example, factor weights can be explicitly assigned at each level of the model. However, the present inventors have determined that the explicit factor weighting of such hierarchical models can often have non-intuitive effects on the results of the decision making process.

A further problem is concerned with the different structures of models for the same decision situation. It is known that model builders often represent the same decision with different models according to their biases and perceptions, often including the same factors but grouping those factors together in different ways, particularly at the lower levels of a hierarchial model. This can lead to models with different emphasis at the leaf factors even if the parent levels have the same weights.

Also, as more child factors are grouped under one parent factor the global weight of the parent level is effectively redistributed amongst the child factors, reducing the importance of each child factor within the group with each new addition.

Accordingly, it is desired to provide a novel decision support system wherein the factor weights in a hierarchial model are employed within the decision support system in a manner which compensates for imbalances caused by varying numbers of child factors.

SUMMARY OF THE INVENTION

It is an object of the present invention to provide a novel decision support system which obviates or mitigates at least one disadvantage of the prior art. It is a further object of the present invention to provide a novel method of performing computer-implemented processing of a decision support system model.

According to one aspect of the present invention, there is provided a decision support system comprising:

input means to accept inputs representing the definition of a hierarchial model of a decision including factors relevant to said decision and respective weights thereof and to accept input representing scores for said factors;

storage means to store a representation of said model and to store said input scores;

processor means to process said model to reduce bias in said weights due to the structure of said model and to determine evaluation scores and a weighted average corresponding to said input scores for said factors; and output means to output said determined weighted average.

According to another aspect of the present invention, there is provided a decision support system comprising:

means to define a hierarchial model of a decision comprising a plurality of factors which are to be considered in making said decision, said model having at least two levels of factors and each said factor having assigned to it a position in said hierarchy and a local weight;

means to calculate global weights representing the impact of said local weights on the overall decision model; and means to compensate said global weights to mitigate bias therein resulting from different numbers of factors at different levels of said hierarchial model.

According to another aspect of the present invention, there is provided a method of processing a hierarchial decision support model having a plurality of factors arranged in at least two levels, at least one of said at least two levels having two or more factors and at least one of said two or more factors is hierarchically associated with a different number of factors in the other of said at least two levels than the other of said two or more factors at the same level, comprising the steps of:

(i) determining local weights assigned to factors in said hierarchial decision support model;

(ii) determining the global weights which result from said determined local weights;

(iii) adjusting said determined global weights to mitigate bias introduced therein by differences in the number and arrangement of factors in said model.

According to yet another aspect of the invention, there is provided an article of manufacture comprising:

a computer usable medium having computer readable program code means embodied therein for implementing a decision support system employing a hierarchial decision model including means to compensate the weights of factors in said model for differences in the number of child factors of parent factors at a given level, the computer readable program code means in said article of manufacture comprising:

computer readable program code means for causing said computer to obtain input representing factors of a decision model;

computer readable program code means for causing said computer to allow hierarchial arrangement of said obtained factors into at least two levels of factors;

computer readable program code means for causing said computer to receive input representing local weights to be assigned to each of said obtained factors; and computer readable program code means for causing said computer to compensate said local weights assigned to each of said obtained factors such that global weights of said obtained factors are modified to mitigate bias by differing number of factors at different levels in said hierarchial arrangement.

According to yet another aspect of the present invention, there is provided a computer implemented process for providing a decision support system, comprising:

defining a hierarchial model having at least two levels of factors of interest to making a decision;

assigning a local weight to each factor of each of said at least two levels;

determining the global weights of each factor which results from processing said model; and compensating said local weights to reduce bias in said determined global weights resulting from differing numbers of factors in at least one level of said hierarchial model.

Preferably, the present invention provides compensation of hierarchial decision models such that different models are comparable, reducing bias introduced by the differing number of factors at various levels. Preferably, the compensation effectively maintains the relative weights originally intended by the model builder, removing or reducing any bias introduced by the structure of the model. In contrast, for the model builder to manually compensate by adjusting individual weights for each of the many factors is, at best, labourious and, at worst, makes models with large numbers of factors impossible to create and handle. Further, even if manual adjustment of the model weights is possible, the resulting models often have non-intuitive weights and use of the model by other evaluators may be constrained.

BRIEF DESCRIPTION OF THE DRAWINGS

Embodiments of the present invention will be described, by way of example only, with reference to the accompanying drawings, in which.

DETAILED DESCRIPTION OF THE PREFERRED EMBODIMENTS

Figure 1:
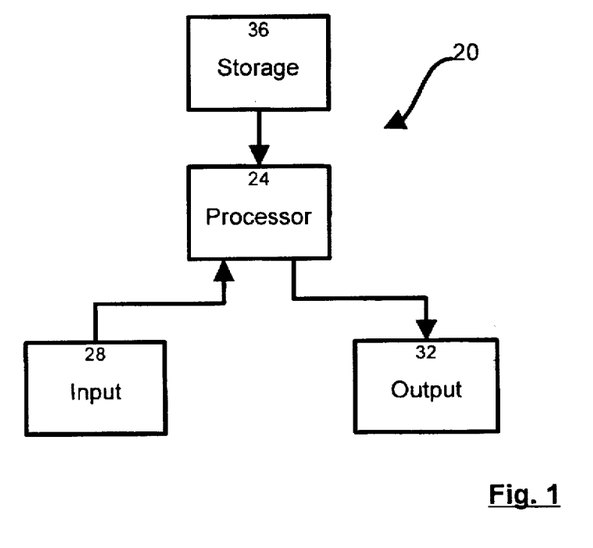
FIG. 1 shows a block diagram of computing hardware embodying a preferred embodiment of the present invention.

FIG. 1 shows a block diagram of a decision support system 20 in accordance with a preferred embodiment of the present invention. System 20 includes processor means 24, input means 28, output means 32 and storage means 36.

Figure 2:
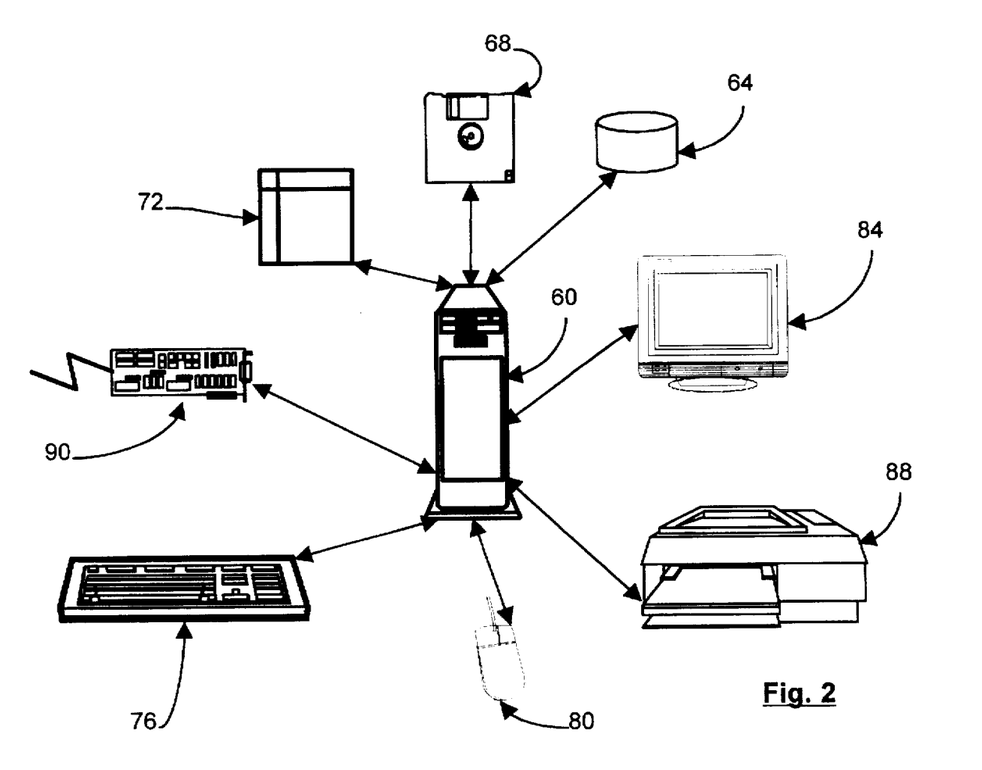
FIG. 2 shows a more specific embodiment of the computing hardware of FIG. 1.

In a more specific embodiment, illustrated in FIG. 2, processor means 24 is a general purpose processor and related circuitry 60, such as an Intel 80×86 family processor; storage means 36 comprises a mass storage device 64, such as a winchester-style disk drive, a removable media storage device 68, such as a 3.5 inch high density disk drive, and RAM and/or ROM memory 72 which is operably connected to processor 60; input means 28 comprises a keyboard 76 and/or pointing device such as a mouse 80; and output means 32 comprises a video display terminal 84, such as a VGA display, and/or a printer 88, such as a HP LaserJet III. In some circumstances, it is contemplated that input means 28 and/or output means 32 may comprise a communications link 90, either in addition to or in place of the above-mentioned components, and communications link 90 may be in the form of a local or wide area network, a radio link, etc. In the embodiment illustrated in FIG. 2, system 20 can also embody a graphical user interface, provided by an operating system such as Microsoft's Windows 95 operating system, executing on processor 60.

Figure 3:
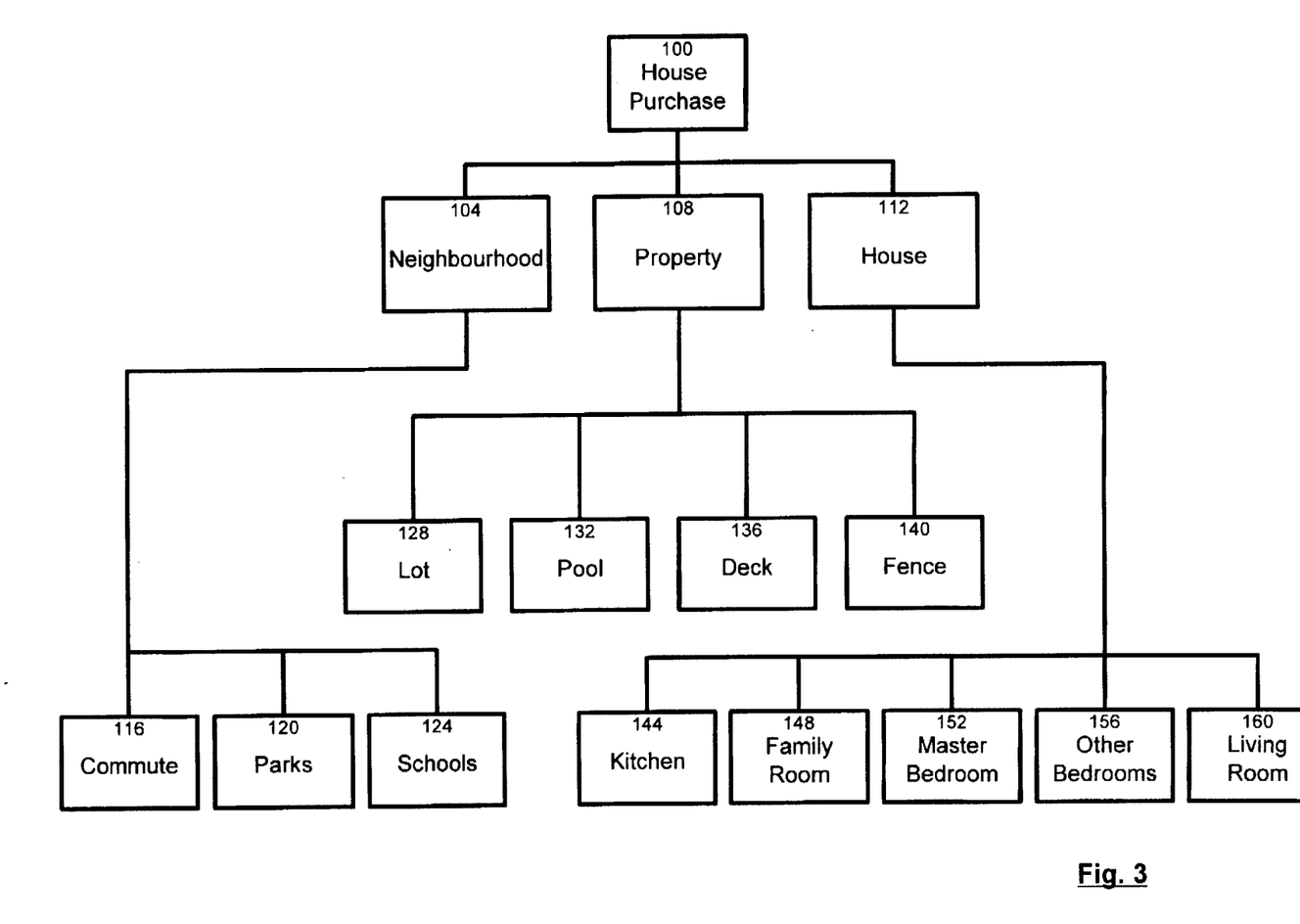
FIG. 3 shows the structure of a house purchase decision model.

FIG. 3 shows an example of part of a simple hierarchial decision model of a house purchase decision which has been created for use with system 20. In this representation of the model, which is based upon a rooted tree paradigm, factors are represented by nodes in the tree. In this example root node 100, which represents the entire decision process, has three child nodes (factors): Neighbourhood 104; Property 108; and House 112. Neighbourhood factor 104 is, in turn, the parent node for three child nodes, which are leaf nodes, namely: Commute 116; Parks 120; and Schools 124.

In a similar manner, Property factor 108 is the parent node of four child nodes, which are leaf nodes, namely: Lot 108;

Pool 132; Deck 136; and Fence 140. Also, House factor 112 is the parent of five child nodes, which are leaf nodes, namely: Kitchen 144; Family Room 148; Master Bedroom 152; Other Bedrooms 156; and Living Room 160. Factors other than leaf factors are referred to herein as classifying factors and the Neighbourhood 104; Property 108 and House 112 factors in FIG. 3 represent classifying factors.

It will be apparent to those of skill in the art that multiple levels of classifying factors may be employed if desired. For example, classifying factor House 112 may have a lower level (child) classifying factor such as Bedrooms, Living Space, Bathrooms, etc., with appropriate leaf factors and/or lower level classifying factors assigned to each.

The effort involved in the production of such decision models may range from the trivial to significant; however, such models are often produced through an iterative design process wherein various factors which influence the decision are decided upon and appropriate weights assigned to those factors. In the produce Which & Why Version 2, manufactured by the assignee of the present invention, such models can be defined by the process of: listing leaf and/or classifying factors with keyboard 76; arranging the listed leaf factors under one or more of the listed classifying factors with keyboard 76 and/or mouse 80; adding any missing classifying factors identified from non-arranged leaf or classifying factors identified on display 84; adding any leaf factors which have now been recognized in reviewing the classifying factors on display 84; repeating one or more steps until satisfied with the model produced.

Once the model is constructed, the model maker assigns a weight, which he deems appropriate, to each factor. These weights can be assigned through explicit specification via keyboard 76 and/or mouse 80, (i.e—House has a weight of 33.33%, i.e.—⅓), and in the presently preferred embodiment of the invention, the present inventors have decided that such weights will be assigned on a local bias rather than on a global basis. Specifically, this means that the sum of the local weights of the children of a parent factor must always be 100%, i.e.—the weights of Neighbourhood factor 104, Property factor 108 and House factor 112 sum to 100%, as do Lot factor 128, Pool factor 132, Deck factor 136 and Fence factor 140.

In a preferred embodiment of the present invention, comparisons are performed between child factors which are siblings, i.e. three comparisons are performed between respective pairs of factors 116, 120 and 124 and six comparisons are performed between respective pairs of factors 128, 132, 136 and 140, etc. In this case, processor 60 causes display 84 to indicate appropriate pairs of factors for comparison and receives from keyboard 76 and/or mouse 80 the responses of the model builder to the comparisons. Processor 60 then produces weights corresponding to the results of these comparisons and these weights are assigned on a local basis so that the sum of the weights of the child factors of a parent factor will always be 100%.

Figure 4:
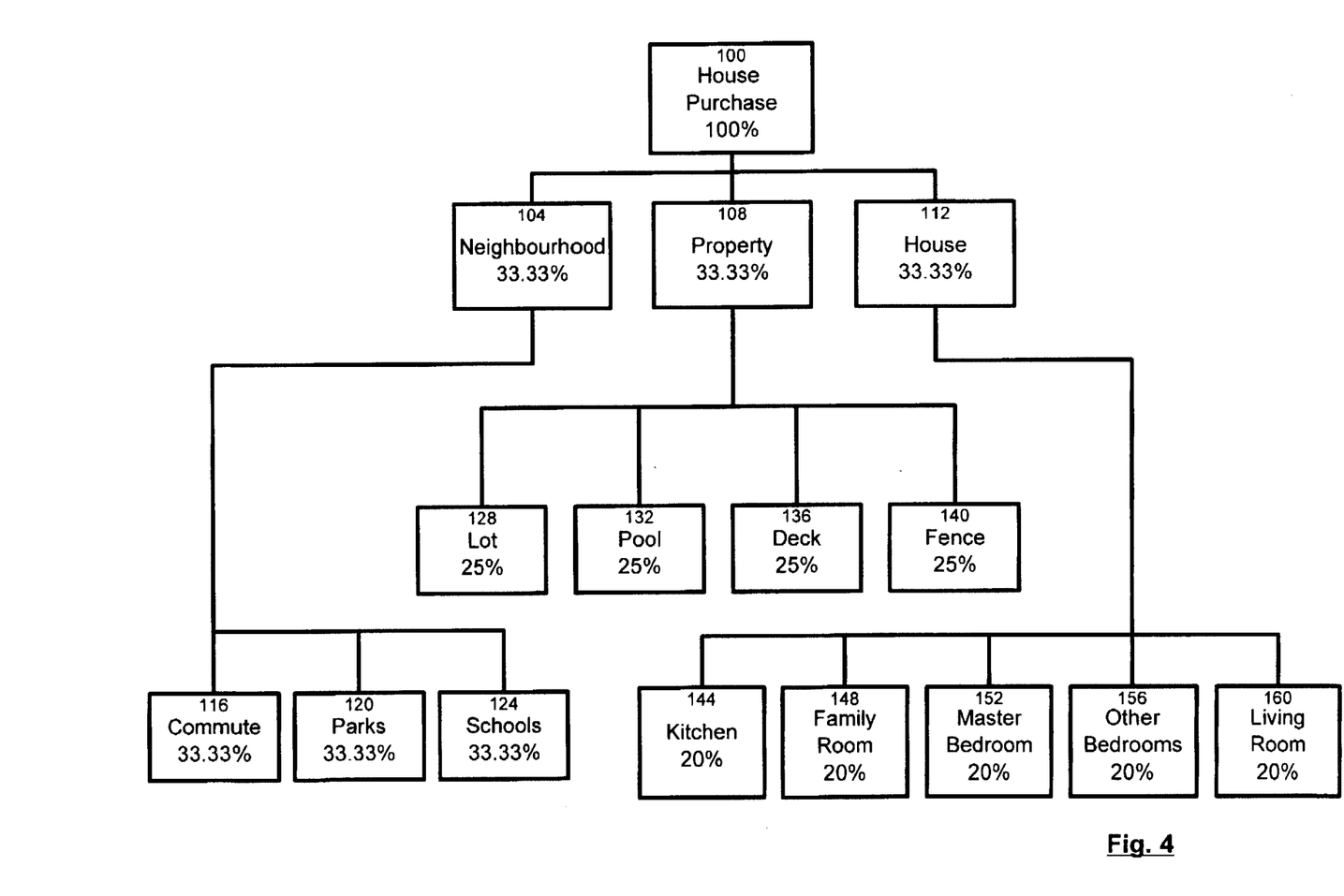
FIG. 4 shows the local weights assigned to the factors of the model of FIG. 3.

FIG. 4 shows the results of assigning weights to the model of FIG. 3, the weights being either explicitly assigned or assigned as a result of the above-mentioned pairwise comparison process. In this model, the model builder intended that each factor at each level have the same weight as each other factor at the same level to the extent that this is possible. Specifically, as will be noted, because weights are assigned on a local basis, the leaf factors have different weights associated with them depending upon the number of their sibling factors (i.e.—Family Room node 148 has four siblings and thus has a weight of 20% while Commute 116 has only two siblings and thus has a weight of 33.33%)

However, while these techniques result in a decision model which appears to be reasonable, such as shown in FIG. 4, non-intuitive results occur because different numbers of sub-classifications or leaf factors are present under different classifying factors. Specifically, the model maker creating the model shown in FIG. 4 desired that each leaf factor have the same global weight. As used herein, the term global weight refers to the potential contribution of a factor to the weighted average and is determined by multiplying the weight of the leaf factor by the weight of each higher level classifying factor it is connected to until the root factor is reached. In the example of FIG. 4, as mentioned above, there are five leaf factors under the House classification and each of these leaf factors has a local weight of 20% (one fifth) of the House classification. Thus, the global weight of the Kitchen leaf factor is 6.67% (Kitchen 20% times House 33.33%).

Clearly, not all of the leaf factors in FIG. 4 have the same global weights. Specifically, each of the leaf factors under the Property classification factor 108 in FIG. 4 has a global weight of 8.33% (i.e.—Lot 25% times Property 33.33%) and each of the leaf factors under the Neighbourhood classification factor 104 have a global weight of 11.1% (Commute 33.33% times Neighbourhood 33.33%). Accordingly, while a model such as that shown in FIG. 4 is preferred over prior art models, the global weight of a leaf factor in such a model is dependent upon the number of its sibling leaf factors and the number of the sibling factors of its parent factors at each level connecting the leaf to the root of the model.

The present inventors have, from experience and from discussion with various evaluators using decision support systems, determined that this variation in the global weight of leaf factors is non-intuitive to most evaluators. This is especially so for more complex models, such as those with multiple levels of classifying factors and intentionally uneven local weights.

Accordingly, the present inventors have determined that the weights of the classifying factors need to be adjusted to compensate for the bias in the global weights of leaf factors which result from different numbers, of child factors at various levels of the model. In the following discussion, this compensation is referred to as balancing.

Figure 5:
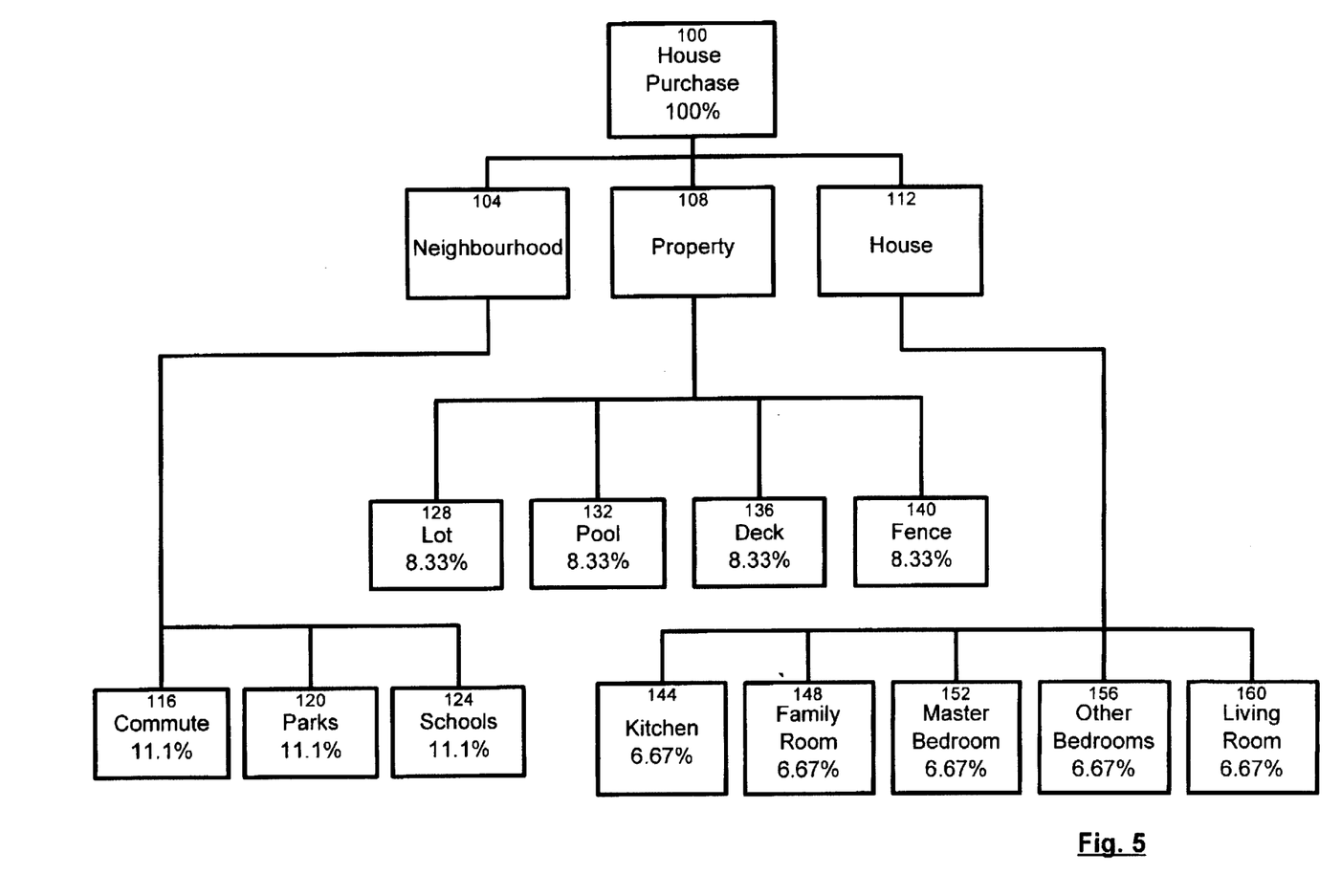
FIG. 5 shows the global weights which result from the local weights of FIG. 3.
Figure 6:
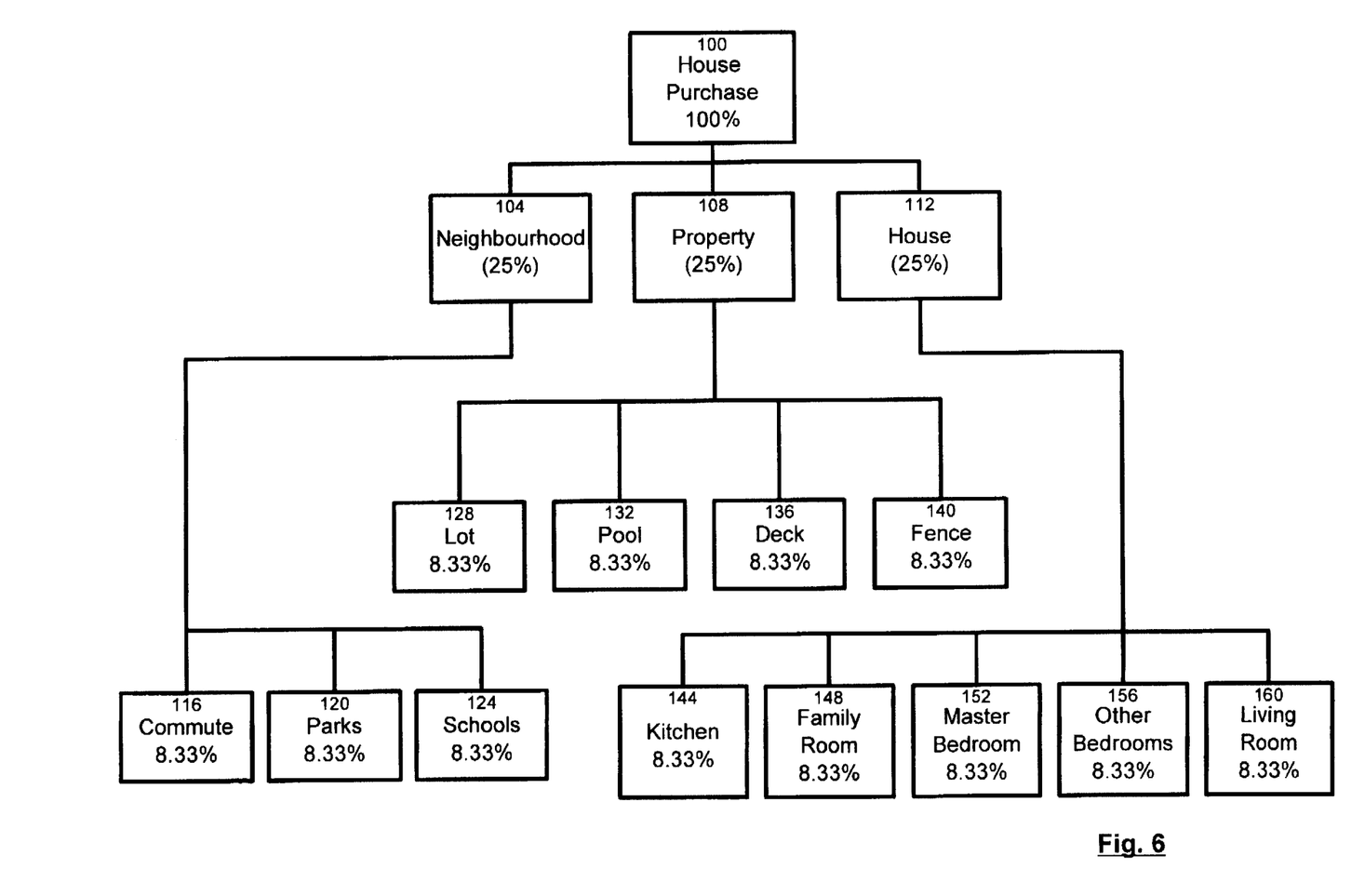
FIG. 6 shows the effect on the global weights of FIG. 5 of balancing coefficients in accordance with an embodiment of the present invention.

FIG. 5 shows the global weights of the model of FIGS. 3 and 4 prior to balancing and FIG. 6 shows the effect of the balancing corrections on the weights (shown in brackets) of the Neighbourhood 104, Property 108 and House 112 classifying factors and the resulting global weights of the leaf factors. These corrections take the form $$\text{adjusted weight} = \text{weight} \cdot b$$

where b is called the balancing coefficient and the adjustments are performed accordingly by processor 60.

As can been seen in FIG. 5, the weight of the House factor 112 has been increased by the balancing coefficient to 41.67% from 33.33%, the weight of Property factor 108 has remained the same and the weight of Neighbourhood factor 104 has been decreased by the balancing coefficient to 25% from 33.33%.

The present inventors have developed two embodiments for determining balancing coefficients for adjusting the weights of parent factors, each of which will be discussed herein, in turn.

By definition, the sum of the local weights of each group of child factors is 100% and, similarly, the sum of the global weights of all of the factors at a given level in the model is 100%, hence $$\sum_{i=1}^{N} w_i = 1 \, (100\%)$$

where N is the number of factors at a given level and $W_i$ is the global weight of factor i. The child factors may also be placed into groups under each parent factor and the equation above rewritten in terms of the global weights grouped under each parent factor:

$$\sum_{i=1}^{n_1} w_i + \sum_{i=n_1+1}^{n_2} w_i + \sum_{i=n_2+1}^{n_3} w_i + \ldots + \sum_{i=n_{g-1}+1}^{N} w_i = 1$$

where n is an index to the factor in each group: i is the ith factor in the group; and g is the number of groups at the selected level. Since the summation of each group of child global weights must equal that of their respective parent global weights $W_j$, the equation above can be written in terms of global weights:

$$\sum_{j=1}^{g} W_j = 1$$

where $$W_j = \sum_{k=n_{j-1}+1}^{n_j} w_k$$

As discussed above, balancing is accomplished by processor 60 determining a balancing coefficient for each parent factor in a level, the weight of the parent factor being multiplied with the balancing factor, $b_j$ by processor 60 to obtain the balanced factor weight. Thus, $$\sum_{j=1}^{g} b_j W_j = 1$$

As $b_i$ is proportional to the number of child factors associated with the parent factor of interest, from the equation above it can be shown that $$b_j = b_1 \left( \frac{m_j}{m_1} \right)$$

where $m_j$ is the number of child factors of the jth parent factor in a given level and is given by $m_j = n_j - n_{j-1}$ and $$b_1 = \frac{1}{W_1 + \frac{m_2}{m_1} W_2 + \ldots + \frac{m_g}{m_1} W_g}$$

or, more generally, $$b_k = \frac{1}{\sum_{j=1}^{g} \left( \frac{m_j}{m_k} \right) W_j}$$

where k is the selected group, g is the total number of child groups (equal to the number of parent factors) in the level of interest, $m_j$ is the number of factors in the jth group and $W_j$ is the global weight of the parent factor. The parent global weight used is the previously calculated balanced weight for that level. The present inventors refer to the coefficient $b_k$ as the Robins balancing coefficient.

As will be apparent, once one balancing coefficient $b_k$ has been calculated by processor 60 for a level in the model using the equation above, the coefficients for the other factors of that level may be easily calculated by processor 60 from the relationship given above, namely $$b_j = b_k \left( \frac{m_j}{m_k} \right)$$

It is contemplated that a model builder or decision evaluator may not be fully satisfied with this approach and another coefficient p, referred to as the balance power value, may be employed to control the degree of balancing, as follows:

$$b_k = \frac{1}{\sum_{j=1}^{g} \left( \frac{m_j}{m_k} \right)^p W_j}$$

and $$b_j = b_k \left( \frac{m_j}{m_k} \right)^p$$

In addition, some accounting of weight distribution may also be desirable, resulting in secondary weight factors $f_j$ whose purpose is to modify the degree of balancing on a per child group basis. In this case the balancing coefficient $b_k$ may be defined by $$b_k = \frac{1}{\sum_{j=1}^{g} f_j \left( \frac{m_j}{m_k} \right)^p W_j}$$

and the relationship between the coefficients becomes $$b_j = b_k f_{jk} \left( \frac{m_j}{m_k} \right)^p$$

where $$f_{jk} = \frac{f_j}{f_k}$$

In a preferred embodiment, these distributions are considered "flat" and $$f_i = 1$$

for all i in the decision model. It will be apparent to those of skill in the art that $f_i$ may be selected in a variety of different manners.

For the example of FIGS. 3 through 6, with the balance power factor $p=1$, the balancing coefficient $b_3$ for House classifying factor 112 is obtained by processor 60 as follows:

$$b_3 = \frac{1}{0.0677 + 0.067 + 0.067 + 0.067 + 0.067 +}$$
$$\frac{4}{5}(0.083) + \frac{4}{5}(0.083) + \frac{4}{5}(0.083) + \frac{4}{5}(0.083) -$$
$$\frac{3}{5}(0.111) + \frac{3}{5}(0.111) + \frac{3}{5}(0.111)$$

which yields $$b_3 = \frac{1}{0.8} = 1.25$$

and thus the 33.33% weight of House classifying factor 112 is multiplied with 1.25 by processor 60 to obtain 41.67% as shown in FIG. 6. In this example, the weight of Neighbourhood factor 104 is multiplied with balance coefficient $b_1=0.75$ and the weight of Property classifying factor 108 is multiplied with balance coefficient $b_2=1.0$.

With this compensation effected, the global weights of the child factors (leaf factors) 116, 120 and 124 of Neighbourhood factor 104 are now all 8.33% (i.e.—Commute 33.33% times Neighbourhood 25%), as are the global weights of the child factors 128, 132, 136 and 140 of Property factor 108 (i.e.—Pool 25% times Property 33.33%) and the global weights of the child factor 144, 148, 152, 156 and 160 of House factor 112 (i.e.—Kitchen 20% times House 41.67%).

Figure 7:
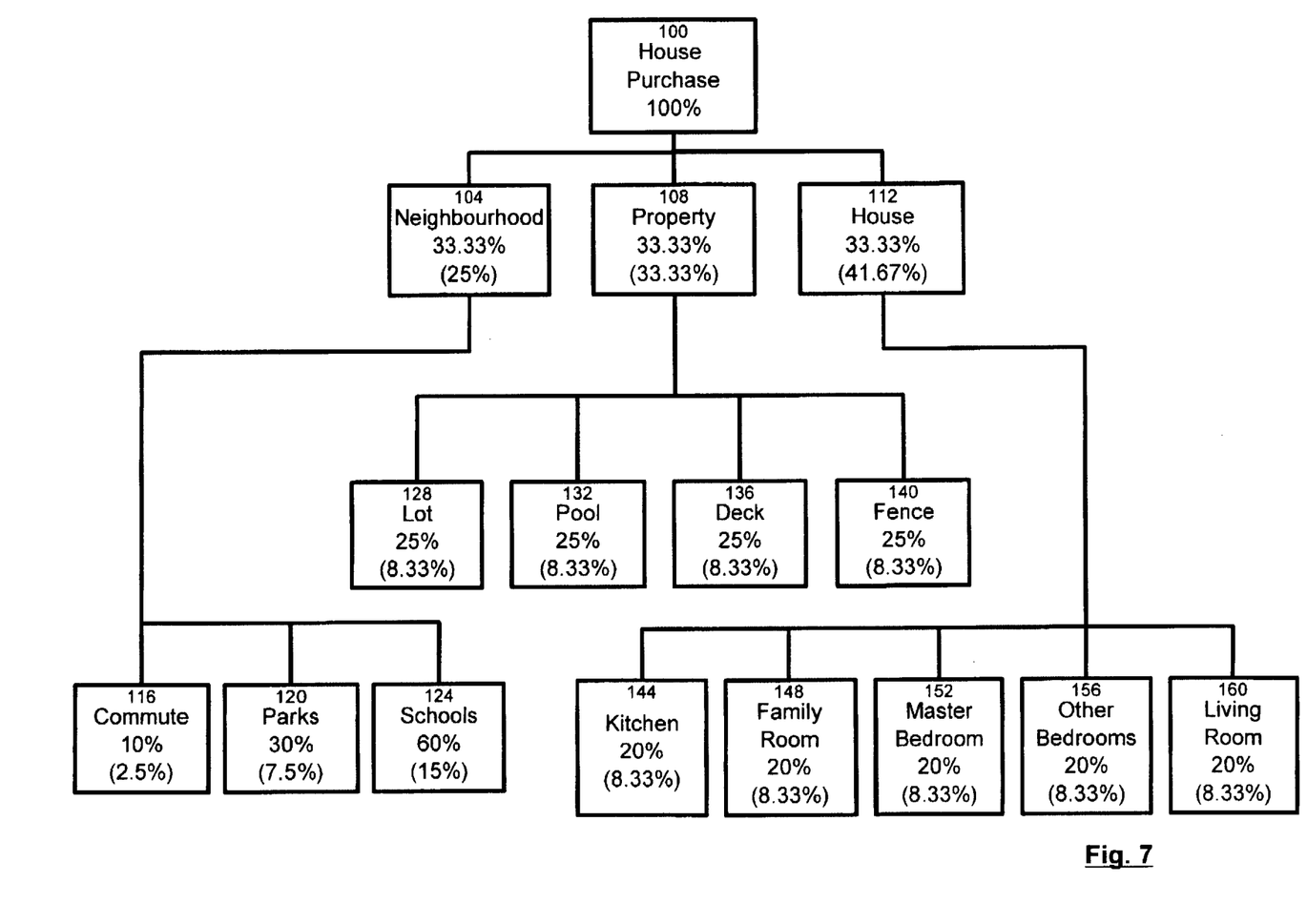
FIG. 7 shows the result of balancing coefficients when some local weights of the model of FIGS. 3 through 6 are modified.

While this is a somewhat simplistic example, the present invention operates in the same manner for the more general case wherein the leaf factors of a parent factor do not all have the same local weight and wherein the model can include multiple levels of classifying factors. For example, FIG. 7 shows the model of FIGS. 3 through 6 wherein the local weights of Commute 116, Parks 120 and Schools 124 have been set at 10%, 30% and 60% respectively. The respective resulting balanced global weights determined by processor 60 are 2.5%, 7.5% and 15% as shown in brackets in the Figure.

It will be clear to those of skill in the art that, for multi-level models, the balancing process is performed in a top-down manner wherein balancing will first be performed on the level of the child factors (level 1) of the root factor (level 0) and is then performed on the level of the child factors of the balanced factors (level 2); etc. until all levels including the leaf factors have been balanced. It should be noted that, when balancing coefficients are being derived for level 2, after the coefficients have been determined for level 1, the coefficients for level 2 are calculated using the balanced global weights of the level 1 factors. The global weights of the higher level factors are then re-calculated, if necessary, in an iterative manner going back up the hierarchy by adding the balanced weights of the child factors at each level together to make the final global weight for their parent and thus ensure consistency throughout the model. This will also be apparent as the global weight must be the sum of the global weights of the children, hence following balancing to the root, the parental global weights must reflect the changes wrought by balancing in accordance with $$\sum_{j=1}^{g} b_j W_j = 1.$$

While the above-described Robins method of calculating balance coefficients has been found to perform satisfactorily, a second embodiment of the present invention, described below, has been found by the present inventors to be preferred by many model builders and/or decision evaluators.

Specifically, in this second embodiment, referred to by the present inventors as the Lobley balancing method, the balancing coefficient is employed in an attempt to compensate for the differences in the number of factors between groups of child factors in a level, rather than directly compensating in proportion to the number of child factors in each group. In this approach, the global weight of the child factor group with the most factors is held initially at unity, and the effect of other groups with fewer factors is reduced by the resulting balance coefficients. The coefficient for a group can be written $$b_j = \frac{1}{(1 + \max[m_1, m_2, \ldots m_N] - m_j)}$$

However, it has been found that the effect of this coefficient is too strong and, for example, a difference of one factor between the groups yields a 50% reduction in the smaller group's weight. To compensate for this, a factor is utilized which reduces the effect, i.e. of the form:

$$b_j \propto \frac{1}{1 + \gamma_j(\max[m_1, m_2 \ldots m_N] - m_j)}$$

The factor $\gamma_j$ in the current embodiment is set to the minimum local weight of the group, as this now assists in reducing the effect of the balancing coefficient and takes somewhat into account the distribution of weights locally within the group. Hence, a balance coefficient which the present inventors have determined to provide satisfactory performance for this embodiment is given by $$b_j = \frac{1}{1 + (m_i - m_j) \cdot \min[w_{jk}]}$$

where $\min[\omega_{jk}]$ is the minimum of the local weights in group j, where we note:

$$\sum_{k=1}^{m_j} W_{jk} = 1(100\%)$$

As will be apparent, unlike the first balancing coefficient method discussed above, there is no precondition for normalization and thus, unlike the previous case $$\sum_{j=1}^{g} b_j W_j \neq 1$$

Therefore, the factors in the level must be normalized by processor 60. This is achieved by summing over all the modified global weights at the level:

$$D - \sum_{j=1}^{g} \left( b_j W_j \sum_{k=1}^{m_j} w_{jk} \right)$$

where $W_{jk}$ are the local weights in the jth group with $m_j$ members and a coefficient $b_j$, $W_j$ is the parent global (balanced) weight and g is the number of parents. This leads to the reduced balance coefficient $b'_j$, referred to herein as the Lobley balancing coefficient.

$$b_j' = \frac{b_j}{D}$$

and thus $$\sum_{j=1}^{g} b_j'' W_j = 1$$

This can also be written in matrix form as BW=I or B'W=I, where B (or B') is the matrix of balance coefficients, W is the matrix of parent weights and I is the diagonal unity matrix in a multilevel model.

Figure 8:
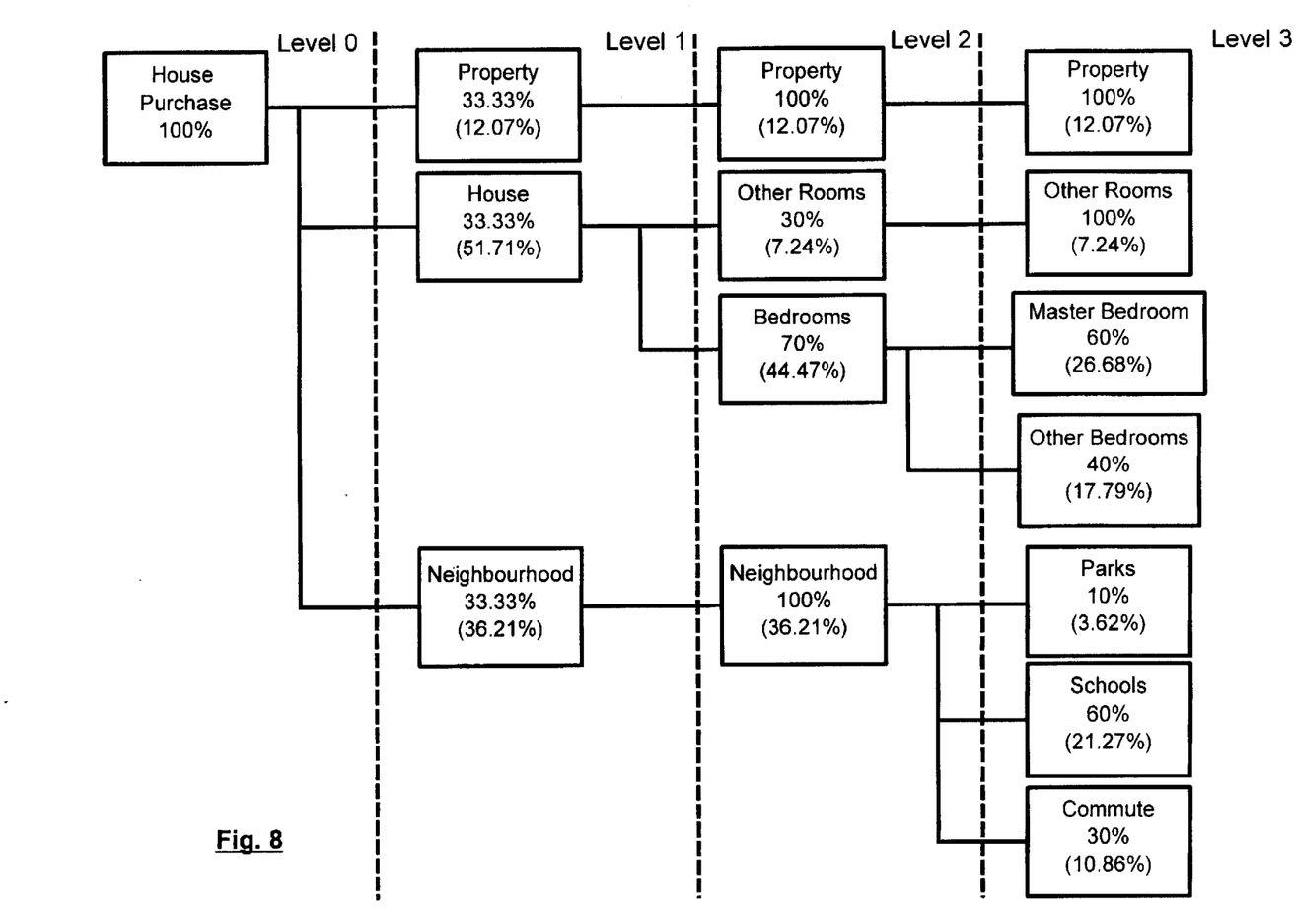
FIG. 8 shows another decision support system model.

FIG. 8 shows another house purchase decision model, with four levels (level 0, 1, 2 and 3) on which the Lobley balancing method has been implemented by system 20. At level 2, processor 60 has determined that the balance coefficients $b'_1$ through $b'_4$ are 0.48, 0.48, 1.27 and 1.45 respectively. At level 1, processor 60 has determined that the balance coefficients $b'_1$, $b'_2$, and $b'_3$ are 0.75, 1.50 and 0.75 respectively. The calculations for deriving these coefficients are shown in Table A.

As is the case for the Robins balancing method described above, the balancing process is performed in a top-down manner wherein balancing will first be performed on the level of the child factors (level 1) of the root factor (level 0) and is then performed on the level of the child factors of the balanced factors (level 2); etc. until all levels of the leaf factors have been balanced. Also, as with the Robins balancing method, when balancing coefficients are being derived for level 2, after the coefficients have been determined for level 1, the coefficients are calculated using the balanced global weights and not the unbalanced global weights.

It is contemplated by the present inventors that in some circumstances it may be desired to balance only a portion of a decision model. In such a situation, referred to herein as partial balancing, a set of factors or group of factors may be selected at a level and balancing performed for them. The fundamental difference in such a partial balancing technique is that the sum of the global weights of the selected factors cannot equal unity, but only their part of the overall global sum. Hence, $$\sum_{j=j_1}^{j_2} b_j W_j \Big|_{j=K} = \epsilon$$

where the sum is over selected groups of factor K to which the jth group belongs and $\epsilon$ has a value less than 1.

The development of the concept of balancing and balancing coefficients to remove bias introduced by the structure of the model is a significant advance on the art of Decision Support systems. From tests made with experienced and with novice evaluators, results have been obtained which are more satisfactory to the evaluators. It is contemplated that, by proper formulation of the balance coefficients, different balancing methods in addition to those described herein may be employed. While the present invention employs the number of factors as the basis for balancing, it has also been contemplated that in some circumstances other basis of balancing may also be employed, if desired, including approaches based: on information theory; and the differences in the number of factors, number of factors within a group, and the relative weights of the groups and factor local or global weights within the groups. Such balancing methods may be applied to each of two or more different models representing the same decision to improve comparability between two or more different models representing the same problem.

TABLE A

Level 1 Calculations:

$$b_{Property\,[Level\,1]} = \frac{1}{1+(2-1)\cdot 1} = 0.5$$

$$b_{Neigh.\,[Level\,1]} = \frac{1}{1+(2-1)\cdot 1.0} = 0.5$$

TABLE A-continued $$b'_{Property\,[Level\,1]} = \frac{b_{Property\,[Level\,1]}}{D} = \frac{0.5}{0.6667} = 0.75$$

$$D = [0.5 \times 0.3333 \times 1] + [1 \times 0.3333 \times (0.3 + 0.7)] +$$
$$[0.5 \times 0.3333 \times 1] = 0.6667$$

$$b'_{Neigh.\,[Level\,1]} = \frac{b_{Neigh.\,[Level\,1]}}{D} = \frac{0.5}{0.6667} = 0.75$$

$$b'_{House\,[Level\,1]} = \frac{b_{House\,[Level\,1]}}{D} = \frac{1.0}{0.6667} = 1.5$$

$$b_{House\,[Level\,1]} = \frac{1}{1+(2-2)\cdot 0.3333} = 1.0$$

Level 2 Calculations:

$$b_{Property\,[Level\,2]} = \frac{1}{1+(3-1)\cdot 1.0} = 0.3333$$

$$b_{Other\,Rooms\,[Level\,2]} = \frac{1}{1+(3-1)\cdot 1.0} = 0.3333$$

$$b_{Bedrooms\,[Level\,2]} = \frac{1}{1+(3-2)\cdot 0.14} = 0.88$$

$$b_{Neigh.\,[Level\,2]} = \frac{1}{1+(3-3)\cdot 0.025} = 1.0$$

$$D_{Level\,2} = [0.3333 \times 0.25 \times 1] + [0.3333 \times 0.15 \times 1] +$$
$$[0.88 \times 0.35 \times (0.6 + 0.4)]$$
$$+ [1.0 \times 0.25 \times (0.1 + 0.6 + 0.3)] = 0.69$$

$$b'_{Property\,[Level\,2]} = \frac{b_{Property\,[Level\,2]}}{D} = \frac{0.3333}{0.69} = 0.48$$

$$b'_{Other\,Rooms\,[Level\,2]} = \frac{b_{Other\,Rooms\,[Level\,2]}}{D} = \frac{0.3333}{0.69} = 0.48$$

$$b'_{Bedrooms\,[Level\,2]} = \frac{b_{Bedrooms\,[Level\,2]}}{D} = \frac{0.88}{0.69} = 1.27$$

$$b'_{Neigh.\,[Level\,2]} = \frac{b_{Neigh.\,[Level\,2]}}{D} = \frac{1.0}{0.69} = 1.45$$

What is claimed is:

1. A method of reducing unwanted bias in a decision support system model including a plurality of factors arranged in a tree hierarchy having a root, classifying factors, and leaf factors arranged in a parent and child hierarchy, said leaf factors comprising decision factors having weights assigned thereto and which can be scored by an evaluator for an alternative under consideration and said classifying factors having weights assigned thereto, comprising the steps of:

(i) assigning local weights to each classifying factor and to each leaf factor in said hierarchy, said assigned local weights being assigned such that the factors which are children of a factor higher in the hierarchy sum to 100%;

(ii) determining a global weight for each classifying factor in turn, said global weight comprising the product of the local weight of the classifying factor and the local weight of each classifying factor in the hierarchy between said classifying factor and said root;

(iii) for each level of classifying factors in said hierarchy, from said root to the classifying factors which are parent factors of said leaf factors, determining a balancing coefficient for each classifying factor, said balancing coefficient being dependent upon the number of classifying factors at the same level in said hierarchy and the relative numbers of child factors of said classifying factors at said level;

(iv) determining an adjusted global weight for each classifying factor in turn, said adjusted global weight being the product of the determined global weight and said determined balancing coefficient for said classifying factor;

(v) determining a balanced global weight for each said leaf factor, said determined balanced global weight for each said leaf factor being equal to the product of said local weight for said leaf factor and the adjusted global weight of each classifying factor in said hierarchy between said leaf factor and said root, said determined balanced global weights for said leaf factors being employed in said decision support system.

2. The method of claim 1 wherein in step (i) said local weights are assigned by pairwise comparison of classifying factors.

3. The method of claim 1 wherein in step (i) said local weights are explicitly assigned when said model is constructed.

4. The method of claim 1 wherein said balancing coefficients are determined from $$b_k = \frac{1}{\sum_{j=1}^{g} \left( \frac{m_j}{m_k} \right) W_j}$$

where $b_k$ is the balancing coefficient for a classifying factor k in a level, g is the total number of classifying factors for the level, $m_j$ is the number of factors which are child factors of factor j in the same level as k, $m_k$ is the number of child factors of classifying factor k and $W_j$ is the global weight of factor j.

5. The method of claim 1 wherein said balancing coefficients are determined from $$b_k = \frac{1}{\sum_{j=1}^{g} \left( \frac{m_j}{m_k} \right)^p W_j}$$

where $b_k$ is the balancing coefficient for a classifying factor k in a level, g is the total number of classifying factors for the level, $m_j$ is the number of factors which are child factors of factor j in the same level as k, $m_k$ is the number of child factors of classifying factor k and $W_j$ is the local weight assigned to factor j and p is a value selected to control the amount of balancing desired.

6. The method of claim 1 wherein said balancing coefficients $b'_j$ for a factor j are determined from $$b_j = \frac{1}{1 + (m_i - m_j) \cdot min[w_{jk}]}$$

where $min[\omega_{jk}]$ is the lowest weight of the local weights of the child factors of factor j, $m_i$ is equal to the number of child factors which are children of the factor at the same level as factor j and which has the greatest number of children, $m_j$ is the number of child factors of factor j and $$b_j' = \frac{b_j}{\sum_{j=1}^{g} \left( b_j W_j \sum_{k=1}^{m_j} w_{jk} \right)}$$

where $\omega_j$ is the global weight of factor j and $W_{jk}$ is the local weight of child factor k of factor j.

7. The method of claim 1 further comprising step(vi) for each classifying factor which is a parent of one or more leaf factors, determining an effective global weight of each said classifying factor by summing the determined balanced global weights of the child leaf factors of said factor and, for each next higher level of classifying factors in said hierarchy in turn, determining the effective global weight of each subsequent classifying factor by summing the determined effective balanced global weights of all the child factors of said subsequent classifying factor.

8. The method of claim 7 wherein said effective global weights of said classifying factors are displayed to a user.

9. The method of claim 1 wherein said hierarchy is a portion of a larger hierarchy, said root of said hierarchy being selected by a user from said larger hierarchy.

10. A computer implemented method for selecting an alternative with a decision support system, comprising:

constructing a decision model comprising a tree hierarchy of a plurality of factors arranged in levels, said hierarchy having a root, classifying factors and leaf factors arranged in parent and child relationships between said levels;

assigning local weights to each said classifying factor corresponding to the importance of said classifying factor to said decision, said local weights being assigned such that the local weights of the child factors of a parent factor sum to 100%;

assigning local weights to each said leaf factor corresponding to the importance of said leaf factor to said decision, said local weights being assigned such that the local weights of the child factors of a parent factor sum to 100%;

determining a global weight for each classifying factor, said global weight comprising the product of the local weight assigned to the classifying factor and the local weight assigned to each classifying factor in the hierarchy between said classifying factor and said root;

for each level of classifying factors in said hierarchy, from said root to the classifying factors which are parent factors of said leaf factors, determining a balancing coefficient for each classifying factor, said balancing coefficient being dependent upon the number of classifying factors at the same level in said hierarchy and the relative numbers of child factors of said classifying factors at said level;

determining an adjusted global weight for each classifying factor in turn, said adjusted global weight being the product of the determined global weight and said determined balancing coefficient for each classifying factor;

determining a balanced global weight for each said leaf factor, said determined balanced global weight for each said leaf factor being equal to the product of said local weight for said leaf factor and the adjusted global weight of each classifying factor in said hierarchy between said leaf factor and said root;

receiving scores for each leaf factor, said scores representing how well said alternative corresponds to said leaf factor; and determining a weighted average equal to the sum of the products of corresponding ones of said scores and said determined balanced global weights.

11. The method of claim 10 wherein said balancing coefficients are determined from $$b_k = \frac{1}{\sum_{j=1}^{g} \left(\frac{m_j}{m_k}\right) W_j}$$

where $b_k$ is the balancing coefficient for a classifying factor k in a level, g is the total number of classifying factors for the level, $m_j$ is the number of factors which are child factors of a factor j in the same level as k, $m_k$ is the number of child factors of classifying factor k and $W_j$ is the global weight of factor j.

12. The method of claim 10 wherein said balancing coefficients are determined from $$b_k = \frac{1}{\sum_{j=1}^{g} \left(\frac{m_j}{m_k}\right)^p W_j}$$

where $b_k$ is the balancing coefficient for a classifying factor k in a level, g is the total number of classifying factors for the level, $m_j$ is the number of factors which are child factors of a factor j in the same level as k, $m_k$ is the number of child factors of classifying factor k and $W_j$ is the global weight of factor j and p is a value selected to control the amount of balancing desired.

13. The method of claim 10 wherein said balancing coefficients $b'_j$ for a factor j are determined from $$b_j = \frac{1}{1 + (m_i - m_j) \cdot \min[w_{jk}]}$$

where $\min[\omega_{jk}]$ is the lowest weight of the local weights of the child factors of factor j, $m_i$ is equal to the number of child factors which are children of the factor at the same level as factor j and which has the greatest number of children, $m_j$ is the number of child factors of factor j and $$b_j' = \frac{b_j}{\sum_{j=1}^{g} \left( b_j W_j \sum_{k=1}^{m_j} w_{jk} \right)}$$

where $W_j$ is the global weight of factor j and $W_{jk}$ is the local weight of child factor k of factor j.

14. The method of claim 10 where said local weights are assigned by pairwise comparison of classifying factors.

15. The method of claim 10 where said local weights are explicitly assigned when said model is constructed.

16. The method of claim 10 further comprising the step of, for each classifying factor which is a parent of one or more leaf factors, determining an effective global weight of each said classifying factor by summing the determined balanced global weights of the child leaf factors of said factor and, for each next higher level of classifying factors in said hierarchy in turn, determining the effective global weight of each subsequent classifying factor by summing the determining effective balanced global weights of all the child factors of said subsequent classifying factor.

17. The method of claim 16 wherein said effective global weights of said classifying factors are displayed to a user.

18. The method of claim 10 wherein said hierarchy is a portion of a large hierarchy, said root of said hierarchy being selected by a user from said larger hierarchy.

19. An article of manufacture comprising:

a computer usable medium having computer readable program code means embodied therein for implementing a method of reducing unwanted bias in a decision support system model including a plurality of factors arranged in a tree hierarchy having a root, classifying factors and leaf factors arranged in a parent and child hierarchy, said leaf factors comprising decision factors having weights assigned thereto and which can be scored by an evaluator for an alternative under consideration and said classifying factors having weights assigned thereto, the computer readable program code means in said article of manufacture comprising:

computer readable code means for causing the computer to assign local weights to each classifying factor and to each leaf factor in said hierarchy, said assigned local weights being assigned such that the factors which are children of a factor higher in the hierarchy sum to 100%;

computer readable code means for causing the computer to determine a global weight for each classifying factor in turn, said global weight comprising the product of the local weight of the classifying factor and the local weight of each classifying factor in the hierarchy between said classifying factor and said root;

computer readable code means for causing the computer to, for each level of classifying factors in said hierarchy from said root to the classifying factors which are parent factors of said leaf factors, determine a balancing coefficient for each classifying factor, said balancing coefficient being dependent upon the number of classifying factors at the same level in said hierarchy and the relative numbers of child factors of said classifying factors at said level;

computer readable code means for causing the computer to determine an adjusted global weight for each classifying factor in turn, said adjusted global weight being the product of the determined global weight and said determined balancing coefficient for said classifying factor;

computer readable code means for causing the computer to determine a balanced global weight for each said leaf factor, said determined balanced global weight for each said leaf factor being equal to the product of said local weight for said leaf factor and the adjusted global weight of each classifying factor in said hierarchy between said leaf factor and said root;

computer readable code means for causing the computer to receive input representing a score indicating the correspondence between an alternative and a leaf factor; and computer readable code means for causing said computer to determine a weighted average equal to the sum of the products of said determined balanced global weights for said leaf factors and the corresponding input scores.

20. An article of manufacture comprising:

a computer usable medium having computer readable program code means embodied therein for implementing a method of reducing unwanted bias in a decision support system model including a plurality of factors arranged in a tree hierarchy having a root, classifying factors and leaf factors arranged in a parent and child hierarchy, said leaf factors comprising decision factors having weights assigned thereto and which can be scored by an evaluator for an alternative under consideration and said classifying factors having weights assigned thereto, the computer readable program code means in said article of manufacture comprising:

computer readable code means for causing the computer to assign local weights to each classifying factor and to each leaf factor in said hierarchy, said assigned local weights being assigned such that the factors which are children of a factor higher in the hierarchy sum to 100%;

computer readable code means for causing the computer to determine a global weight for each classifying factor in turn, said global weight comprising the product of the local weight of the classifying factor and the local weight of each classifying factor in the hierarchy between said classifying factor and said root;

computer readable code means for causing the computer to, for each level of classifying factors in said hierarchy from said root to the classifying factors which are parent factors of said leaf factors, determine a balancing coefficient for each classifying factor, said balancing coefficient being dependent upon the number of classifying factors at the same level in said hierarchy and the relative numbers of child factors of said classifying factors at said level;

computer readable code means for causing the computer to determine an adjusted global weight for each classifying factor in turn, said adjusted global weight being the product of the determined global weight and said determined balancing coefficient for said classifying factor;

computer readable code means for causing the computer to determine a balanced global weight for each said leaf factor, said determined balanced global weight for each said leaf factor being equal to the product of said local weight for said leaf factor and the adjusted global weight of each classifying factor in said hierarchy between said leaf factor and said root;

computer readable code means for causing the computer to receive input representing a score indicating the correspondence between the an alternative and a leaf factor; and computer readable code means for causing computer to use said determined balanced global weights for said leaf factors and the corresponding input scores in said decision support system.

* * * * *